US010021632B2

(12) United States Patent
Lindoff et al.

(10) Patent No.: US 10,021,632 B2
(45) Date of Patent: *Jul. 10, 2018

(54) CELL SEARCH AND CONNECTION PROCEDURES IN A CELLULAR COMMUNICATION DEVICE

(71) Applicant: Telefonaktiebolaget LM Ericsson (publ), Stockholm (SE)

(72) Inventors: Bengt Lindoff, Bjarred (SE); Andres Reial, Malmo (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/822,177

(22) Filed: Nov. 26, 2017

(65) Prior Publication Data

US 2018/0077636 A1  Mar. 15, 2018

Related U.S. Application Data

(63) Continuation of application No. 15/304,531, filed as application No. PCT/EP2014/076106 on Dec. 1, 2014, now Pat. No. 9,854,511.

(51) Int. Cl.
*H04W 48/16* (2009.01)
*H04J 11/00* (2006.01)
(Continued)

(52) U.S. Cl.
CPC ......... *H04W 48/16* (2013.01); *H04J 11/0069* (2013.01); *H04W 48/18* (2013.01); *H04W 56/0035* (2013.01)

(58) Field of Classification Search
CPC . H04W 48/16; H04W 56/0035; H04W 48/18; H04J 11/0069
See application file for complete search history.

(56) References Cited

U.S. PATENT DOCUMENTS 7,994,933 B2    8/2011  Cahill-O'Brien et al.
8,391,918 B2 *  3/2013  Ekici ............... H04W 48/18
                                                   455/428
(Continued)

FOREIGN PATENT DOCUMENTS

CA    2795382 A1    12/2011
EP    0862834 B1    1/2007
(Continued)

OTHER PUBLICATIONS

PCT International Search Report, dated Sep. 10, 2015, in connection with International Application No. PCT/EP2014/076106, all pages.

(Continued)

*Primary Examiner* — Brandon J Miller
(74) *Attorney, Agent, or Firm* — Leffler Intellectual Property Law, PLLC

(57) ABSTRACT

A cell-search method for a cellular communication device capable of communicating via a first radio-access technology, RAT, in a first frequency band, and via a second RAT in a second frequency band, which is in a higher frequency region than the first frequency band is disclosed. The method comprises performing a first cell search in the first frequency band in order to detect a first cell of the first RAT. The method further comprises, if such a first cell is detected, synchronizing to the first cell, without registering to the first cell, determining a reference frequency error estimate between a local reference frequency of the cellular communication device and reference frequency of the first cell, and thereafter performing a second cell search, based on the reference frequency error estimate, in the second frequency band to detect a second cell of the second RAT. A corresponding cellular communication device, computer program product, and computer-readable medium are also disclosed.

10 Claims, 4 Drawing Sheets

(51) Int. Cl.
*H04W 56/00* (2009.01)
*H04W 48/18* (2009.01)

(56) References Cited

U.S. PATENT DOCUMENTS

| | | | |
|---|---|---|---|
| 8,463,259 B2* | 6/2013 | Sokondar | H04W 48/16 370/216 |
| 8,843,133 B2 | 9/2014 | Chen | |
| 2012/0184269 A1 | 7/2012 | Wilhelmsson et al. | |
| 2012/0252446 A1 | 10/2012 | Reial et al. | |
| 2013/0045707 A1 | 2/2013 | Lee et al. | |
| 2013/0130724 A1 | 5/2013 | Kumar Reddy et al. | |
| 2013/0308481 A1 | 11/2013 | Kazmi et al. | |
| 2015/0092709 A1* | 4/2015 | Su | H04W 48/16 370/329 |
| 2016/0050599 A1* | 2/2016 | Yang | H04W 36/0022 455/436 |
| 2016/0165576 A1* | 6/2016 | Awoniyi-Oteri | H04B 1/0064 370/338 |
| 2016/0262092 A1* | 9/2016 | Lee | H04W 48/16 |

FOREIGN PATENT DOCUMENTS

| | | |
|---|---|---|
| RU | 2464730 C2 | 10/2012 |
| RU | 2518511 C2 | 10/2014 |
| WO | 2008082367 A1 | 7/2008 |

OTHER PUBLICATIONS

PCT Written Opinion, dated Sep. 10, 2015, in connection with International Application No. PCT/EP2014/076106, all pages.
English language translation of Russian Office Action, dated Apr. 2, 2018, in connection with Russian Application No. 2017113929/08(024368), 3 pages.
Russian Office Action, dated Apr. 2, 2018, in connection with Russian Application No. 2017113929/08(024368), 4 pages.
English language translation of Russian Search Report, dated Apr. 2, 2018, in connection with Russian Application No. 2017113929/08(024368), 2 pages.
Russian Search Report, dated Apr. 2, 2018, in connection with Russian Application No. 2017113929/08(024368), 2 pages.

* cited by examiner

CELL SEARCH AND CONNECTION PROCEDURES IN A CELLULAR COMMUNICATION DEVICE

CROSS-REFERENCE TO RELATED APPLICATIONS

This application claims the benefit of U.S. application Ser. No. 15/304,531 filed Oct. 16, 2016 (371(c) date), which is a 35 U.S.C. § 371 national stage of international application PCT/EP2014/076106 filed Dec. 1, 2014. All of these earlier applications are hereby incorporated herein by reference in their entireties.

TECHNICAL FIELD

The present invention relates to cell-search procedures in a cellular communication network.

BACKGROUND

Further evolution of cellular communication systems, such as what is sometimes referred to as 5th generation (5G) cellular communication systems, will typically require bitrate performance in the order of Gb/s and signal frequency bandwidths in the order of 100 MHz in the downlink. For comparison, the maximum signal bandwidth (for a single component carrier) in a current 3GPP (3rd Generation Partnership Program) LTE (Long Term Evolution) cellular communication system is 20 MHz. i.e. a factor 5 lower. In order to find such free bandwidths, the carrier frequency may need to increase a factor 10-20 above the current (radio frequency, RF) carrier frequencies used in present 2nd, 3rd, and 4th generation (2G, 3G or 4G) cellular communications systems, which are normally in the range 1-3 GHz.

Normally, low cost and low power consumption is desirable for cellular communication devices. At the same time, there is also a desire for cellular communication devices to be capable of operating in multiple radio access technologies (RATs). A device having such multi-RAT functionality is in the following referred to as a multi-RAT device. For example, a 4G device is normally also support operation in 2G and 3G communications systems. A reason for this is the gradual deployment of new RATs, whereby the use of a single new RAT is limiting from an end user perspective. Therefore, it is likely that new devices in the near future, supporting a 5G cellular system, also need to support legacy systems, such as one or more of 2G, 3G, and 4G systems.

A reference clock signal to a radio transceiver circuit of a cellular communication device can be provided by a crystal oscillator. The crystal oscillator can for example be designed to operate at 26 MHz, and be driven by a low-cost 32 kHz reference clock-signal generator. In order to meet constraints of low cost and low power, a certain degree of inaccuracy of the crystal oscillator must normally be accepted. The open loop uncertainty (maximum deviation from a nominal value) of the crystal oscillator frequency may be in the order of 10-15 ppm. Hence, once a cellular communication device is powered on, there is an uncertainty with respect to the reference frequency in the device, which needs to be handled by the device during an initial cell search process when the device searches for a cell to synchronize with.

In a 2G system, such as a GSM (Global System for Mobile communications) system, for which the carrier frequency is slightly below 1 GHz, the frequency uncertainty at power up of the cellular communication device can be in the order of 10-15 kHz. The FCCH (Frequency Correction CHannel) burst in GSM, which is a 67.7 kHz signal, is typically tolerant to frequency errors in that order, and typically no specific measures need to be taken during the initial cell search due to the inaccuracy of the crystal oscillator.

However, in a 3G system, such as a UMTS (Universal Mobile Telecommunications System) system, or a 4G system, such as an LTE (Long Term Evolution) system, which typically operates with carrier frequencies around 2-3 GHz, the frequency uncertainty at power up of the cellular communication device can be in the order of 20-45 kHz. At the same time, the PSCH/SSCH (Primary Synchronization CHannel/Secondary Synchronization CHannel) in a UMTS system and the PSS/SSS (Primary Synchronization Signal/Secondary Synchronization Signal) in an LTE system are typically robust for frequency errors up to 3-4 kHz. For these types of systems, so called frequency gridding can be used for the initial cell search. A frequency-gridding procedure is outlined in the following.

The actual carrier frequency of the (RF) carrier is in the following referred to as the nominal carrier frequency. With a zero frequency error in the cellular communication device, it appears to the cellular communication device that the carrier is actually located (in frequency) at this nominal carrier frequency. If, however, there is a non-zero frequency error in the cellular communication device, it appears to the cellular communication device that the carrier is located (in frequency) at some other carrier frequency. When frequency gridding is performed, the cellular communication device hypothesizes a number of such other carrier frequencies. Thereby, a set of hypothesized carrier frequencies, which may include also the nominal carrier frequency, is obtained around the nominal carrier frequency. The cellular communication device then performs a search on the hypothesized carrier frequencies until the carrier is detected. Detecting the carrier may e.g. mean detecting a synchronization channel (such as the FCCH in GSM or PSCH/SSCH in UMTS) or a synchronization signal (such as the PSS/SSS in LTE) modulated onto the carrier. Based on knowledge of the actual carrier frequency and the hypothesized carrier frequency on which the carrier was detected, the cellular communication device can then estimate the frequency error in the cellular communication device and take corrective measures in order to synchronize the reference frequency in the cellular communication device with the reference frequency of the cellular communication network.

In 3G and 4G systems, typically around 5-6 grid points are needed in order to reliably detect the PSCH/SSCH and PSS/SSS, respectively.

SUMMARY

The inventors have realized that for upcoming 5G cellular communications systems, or other systems expected to operate on carrier frequencies around 10-30 GHz, the initial frequency error may be up to 200-300 kHz at a 30 GHz carrier frequency. Furthermore, assuming that the sample rate may be approximately 5 times that of LTE, the synchronization signal design for such systems may only be robust to frequency errors around 5 times the LTE case, or 15-20 kHz. Hence, using a the frequency gridding approach as outlined above, the search grid would have to be significantly increased, compared with LTE, in order to detect and register to a cell in such a system. The inventors have therefore realized that there is a need for an alternative cell-search approach. Embodiments of the present invention are based on the inventors' insight that the required search grid can be reduced by first synchronizing to a cell of another RAT in a lower frequency region, thereby reducing the uncertainty of the internal reference frequency of a cellular communication device.

According to a first aspect, there is provided a cell-search method for a cellular communication device capable of communicating via a first radio-access technology (RAT) in a first frequency band, and via a second RAT in a second frequency band, which is in a higher frequency region than the first frequency band. The method comprises performing a first cell search in the first frequency band in order to detect a first cell of the first RAT. Furthermore, the method comprises, if such a first cell is detected, synchronizing to the first cell without registering to the first cell, determining a reference frequency error estimate between a local reference frequency of the cellular communication device and reference frequency of the first cell, and thereafter performing a second cell search, based on the reference frequency error estimate, in the second frequency band to detect a second cell of the second RAT.

Performing the second cell search may comprise searching a frequency grid of a set of hypothesized carrier frequencies, wherein the frequency location of said frequency grid is based on the reference frequency error estimate. The frequency location of said frequency grid may also be based on the relative frequency location of the first frequency band and the second frequency band.

The method may further comprise, if such a first cell in the first frequency band is not detected, performing a second cell search, based on a default reference frequency error estimate, in the second frequency band to detect a second cell of the second RAT.

According to some embodiments, the first frequency band is located below 4 GHz and the second frequency band is located above 10 GHz.

The first RAT may be any of a 2nd generation (2G) cellular communication RAT, a 3rd generation (3G) cellular communication RAT, and a 4th generation (4G) cellular communication RAT.

The second RAT may e.g. be a 5th generation (5G) cellular communication RAT.

According to a second aspect, there is provided a method for said cellular communication device of connecting to a cell of the second RAT. The method comprises performing the cell-search method according to the first aspect, and, if said second cell is detected, registering with the second cell.

According to a third aspect, there is provided a cellular communication device capable of communicating via a first radio-access technology (RAT) in a first frequency band and via a second RAT in a second frequency band, which is in a higher frequency region than the first frequency band. The cellular communication device comprises a control unit. The control unit is adapted to perform a first cell search in the first frequency band in order to detect a first cell of the first RAT. Furthermore, the control unit is adapted to, if such a first cell is detected, synchronize to the first cell, without registering to the first cell, determine a reference frequency error estimate between a local reference frequency of the cellular communication device and a reference frequency of the first cell, and thereafter perform a second cell search, based on the reference frequency error estimate, in the second frequency band to detect a second cell of the second RAT.

The control unit may be adapted to, in order to perform the second cell search, search a frequency grid of a set of hypothesized carrier frequencies, wherein the frequency location of said frequency grid is based on the estimated reference frequency error. The frequency location of said frequency grid may also be based on the relative frequency location of the first frequency band and the second frequency band.

The control unit may be adapted to, if such a first cell in the first frequency band is not detected, perform a second cell search, based on a default reference frequency error estimate, in the second frequency band to detect a second cell of the second RAT.

According to some embodiments, the first frequency band is located below 4 GHz and the second frequency band is located above 10 GHz.

The first RAT may be any of a 2nd generation (2G) cellular communication RAT, a 3rd generation (3G) cellular communication RAT, and a 4th generation (4G) cellular communication RAT.

The second RAT may e.g. be a 5th generation (5G) cellular communication RAT.

The control unit may be adapted to, if said second cell is detected, register the cellular communication device with the second cell.

According to a fourth aspect, there is provided a computer program product comprising computer program code for executing the method according to any of the first and the second aspect when said computer program code is executed by a programmable control unit of the cellular communication device.

According to a fifth aspect, there is provided a computer readable medium having stored thereon a computer program product comprising computer program code for executing the method according to any of the first and the second aspect when said computer program code is executed by a programmable control unit of the cellular communication device.

Further embodiments are defined in the dependent claims. It should be emphasized that the term "comprises/comprising" when used in this specification is taken to specify the presence of stated features, integers, steps, or components, but does not preclude the presence or addition of one or more other features, integers, steps, components, or groups thereof.

BRIEF DESCRIPTION OF THE DRAWINGS

Further objects, features and advantages of embodiments of the invention will appear from the following detailed description, reference being made to the accompanying drawings, in which.

DETAILED DESCRIPTION

Figure 1:
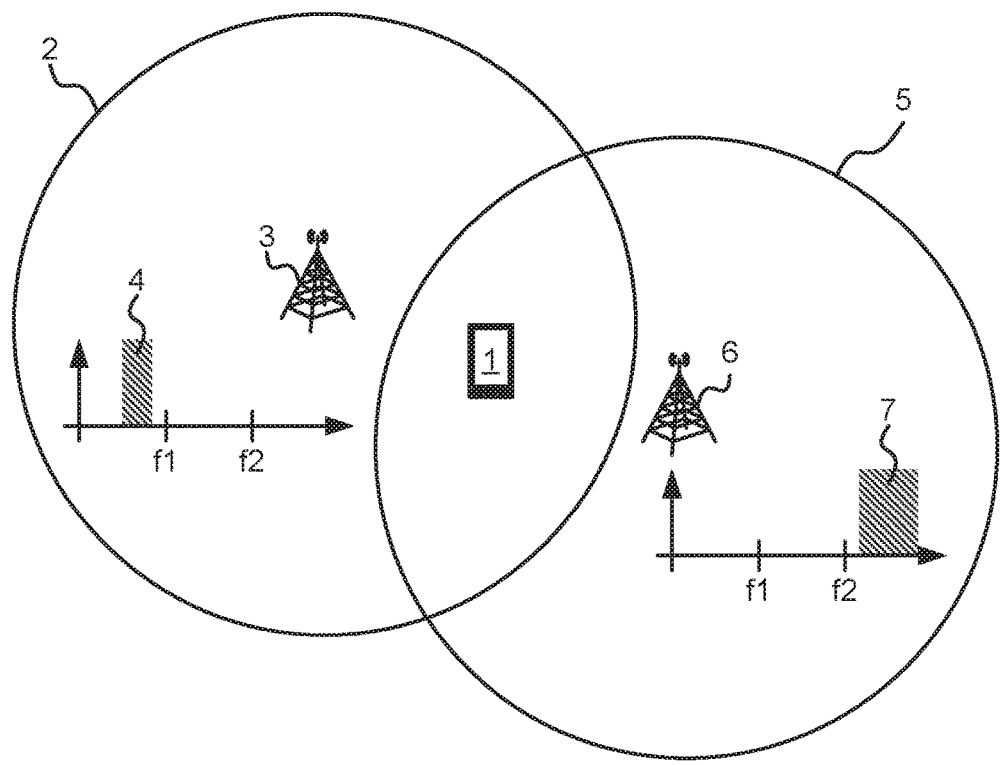
FIG. 1 illustrates a cellular communication environment.

FIG. 1 illustrates an environment in which embodiments of the present invention may be employed. A cellular communication device 1 is in coverage of a first cell 2 and a second cell 5. The cellular communication device is illustrated in FIG. 1 as a mobile telephone. However, this is only an example, the cellular communication device may be any type of device capable of communicating over a cellular communication network, including computers, such as a portable computer or tablet computer, equipped with a cellular modem, or machine-type communication devices, such as sensors etc. equipped with a cellular modem.

The first cell 2 is illustrated in FIG. 1 as being served by a first base station 3. The second cell 5 is illustrated in FIG. 1 as being served by a second base station 6. In the example of FIG. 1, the first cell 2 is a cell of a first radio-access technology (RAT) operating in a first frequency band 4. Furthermore, the second cell 5 is a cell of a second RAT operating in a second frequency band 7, which is in a higher frequency region than the first frequency band 4. This is illustrated in FIG. 1, where the first frequency band 4 is located below a frequency f1, and the second frequency band is located above a frequency f2, where f2>f1. According to an example used throughout this detailed description, the frequency f1 can e.g. be 4 GHz. and the frequency f2 can e.g. be 10 GHz. The first RAT may e.g. be any of a 2nd generation (2G) cellular communication RAT, a 3rd generation (3G) cellular communication RAT, and a 4th generation (4G) cellular communication RAT. Furthermore, the second RAT may e.g. be a 5th generation (5G) cellular communication RAT. Alternative network configurations may include those where cells 2 and 5 cover overlapping areas and are served from the same base station.

Figure 2:
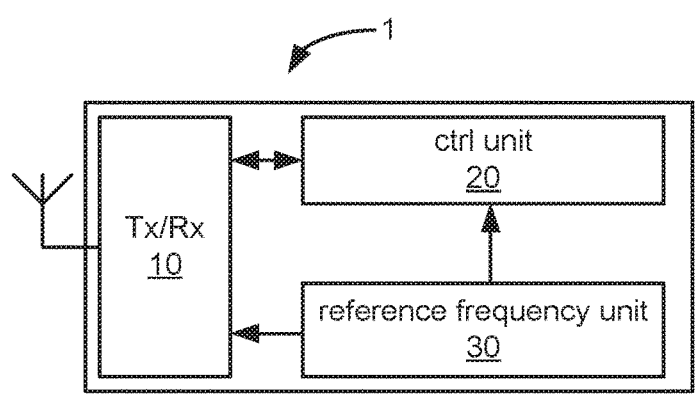
FIG. 2 is a simplified block diagram of a cellular communication device according to embodiments.

FIG. 2 is a simplified block diagram of the cellular communication device 1 according to an embodiment of the present invention. In the embodiment shown in FIG. 1, the cellular communication device 1 comprises a transceiver unit 10. The transceiver unit 10 may e.g. comprise a transmitter arranged to transmit signals to a cellular communication network and a receiver arranged to receive signals from a cellular communication network. The receiver may e.g. comprise one or more analog and/or digital filters, low-noise amplifiers, mixers, and/or other circuitry for receiving a radio-frequency (RF) signal and converting it to a lower-frequency signal, such as a baseband signal. Furthermore, the receiver may comprise one or more analog-to-digital converters (ADCs) for converting the lower-frequency signal into the digital domain. The transmitter may e.g. comprise one or more digital-to-analog converters (DACs) for converting a digital baseband signal, to be transmitted, into an analog signal. Furthermore, the transmitter may comprise one or more analog and/or digital filters, mixers, power amplifiers, and/or other circuitry for upconverting that analog signal to an RF signal and amplifying the RF signal in a manner suitable for transmission. Such receivers and transmitters are well known in the art of cellular communication and are not further described herein.

In the embodiment illustrated in FIG. 1, the cellular communication device 1 further comprises a control unit 20. The control unit 20 may e.g. be or be part of a digital baseband circuit, such as a digital baseband processor. The control unit 20 is operatively connected to the transceiver 10 for controlling the operation of the transceiver 10. Moreover, the cellular communication device 1 comprises a reference frequency unit 30. The reference frequency unit 30 is arranged to provide a reference clock signal, having a reference frequency, to the cellular communication device 1, for instance to the transceiver 10, and possibly also to the control unit 20, of the cellular communication device 1. The reference frequency unit 30 may e.g. be or comprise a crystal oscillator.

The inventors have realized that when the cellular communication device 1 is started up, or for some other reason (e.g. a longer time of inactivity, or "sleep mode") is out of synch with respect to the available RATs, and requested to search for a cell (e.g. the second cell 5) of the second RAT, the frequency synchronization with the cell of the second RAT can actually be made faster by first synchronizing with a cell (e.g. the first cell 2) of the first RAT, compared with directly attempting a frequency gridding approach to search for the cell of the second RAT. If the cellular communication device 1 first synchronizes with a cell of the first RAT, without registering to the cell of the first RAT, the uncertainty of the reference frequency in the cellular communication device is reduced. Taking an LTE cell operating at 2.5 GHz as an example of the first cell 2, the following assumptions are valid. Detecting the PSS/SSS is possible up to frequency error of 1.5-2 kHz. Hence, once an LTE cell PSS/SSS have been reliable detected the residual frequency error can be expected to be less than 2 kHz. Furthermore, synchronization refinement using the Common Reference Signals (CRS) (pilot symbols) can reduce the residual frequency error down to about 500 Hz, at the price of slightly longer synchronization times compared with detecting PSS/SSS only. Similar numbers is achieved in if a WCDMA cell is used as the first cell; if the synchronization is based on PSCH/SSCH detection, the residual frequency error is about 2 kHz, and if the synchronization is based on CPICH detection, the residual frequency error is about 500 Hz. The mentioned residual frequency errors are the errors at the carrier frequency of the first cell. When searching for a cell of the second RAT, these residual frequency errors are then expanded proportionally to the ratio between the carrier frequency of the second RAT and the carrier frequency of the first RAT. For instance, it is expanded 10 times when the carrier frequency of the second RAT is ten times higher than the carrier frequency of the first RAT. By first synchronizing to the first RAT, the number of hypothesized carrier frequencies used in the frequency gridding cell search in the second RAT can be reduced compared with directly attempting a frequency gridding approach to search for the cell of the second RAT. Even though the synchronization with the cell of the first RAT takes some time to perform, which has to be taken into account in (or included in) the overall time it takes to perform the cell search in the second RAT, that overall time can nevertheless be reduced compared with directly attempting a frequency gridding approach to search for the cell of the second RAT.

Accordingly, in accordance with some embodiments of the present invention, there is provided a cell-search method for the cellular communication device 1, which is capable of communicating via the first RAT in the first frequency band 4, and via the second RAT in the second frequency band 7. The method may e.g. be applied when the cellular communication device 1 has just been started up and is to perform the first cell search after start up. It may also be applied in active mode when the cellular communication device 1 operates in a discontinuous reception (DRX) mode with very long sleep time (e.g. minutes or hours of sleep time), which is expected to be available for some use cases in emerging 5G systems. Then the reference frequency unit may have drifted too much, and hence a cell search similar to an initial cell search at startup may be needed. As indicated above, the method may also be applied when the cellular communication device 1 for any other reason is out of synch with respect to the available RATs, and requested to search for a cell (e.g. the second cell 5) of the second RAT.

The method may e.g. be performed by the control unit 20 (FIG. 2), utilizing the transceiver unit 10 (FIG. 2) for receiving signals from base stations (e.g. 3 and 6 in FIG. 1). According to embodiments of the present invention, the method comprises performing a first cell search in the first frequency band 4 in order to detect a first cell (e.g. the cell 2) of the first RAT. If such a first cell 2 is detected, the method further comprises synchronizing to the first cell, without registering to the first cell, and determining a reference frequency error estimate between a local reference frequency of the cellular communication device 1 and a reference frequency of the first cell 2. Thereby, the uncertainty of the reference frequency in the cellular communication device is reduced. Thereafter, the method comprises performing a second cell search, based on the reference frequency error estimate, in the second frequency band 7 to detect a second cell (e.g. the cell 5) of the second RAT. Due to the reduction in uncertainty of the reference frequency in the cellular communication device achieved by synchronizing with the first cell, a relatively small search grid can be applied when performing the cell search for the second cell, which speeds up the overall search time, even including the time it takes synchronizing with the first cell. Avoiding registering with the first cell 2 before searching for the second cell 5 helps reducing the overall search time, compared with if the cellular communication device 1 would first register with the first cell 2 before searching for the second cell 5. Parameters that affect the uncertainty of the reference frequency after the synchronization with the first cell 2 may include the type of first RAT (e.g. 2G, 3G, or 4G), which reference signals have been used for synchronization (e.g. PSS/SSS, CRS, PSCH/SSCH, or CPICH as mentioned above), and receiver processing parameters used for synchronizing to the first cell 2 (e.g. amount of averaging, or filtering, of the reference signals).

The term "reference frequency error estimate" when used in this specification refers to an entity representing the bounds, or tolerances, within which the frequency error lies, and can e.g. represent these bounds in absolute terms, such as ±X Hz, or in relative terms, such as ±Z ppm. In some embodiments, such an entity may explicitly state the reference frequency error estimate (e.g. ±X Hz or ±Z ppm). In other embodiments, such an entity may be in the form of an index, such as an integer, implicitly indicating the value of the reference frequency error estimate. For example, an index '1' may imply '500 Hz' and an index '2' may imply '2 kHz', etc. The determination of the reference frequency error estimate can e.g. be based on the type of first RAT, which reference signals of the first RAT that has been used for the synchronization (e.g. PSS/SSS, CRS, PSCH/SSCH, or CPICH as mentioned above), and/or receiver processing parameters used for synchronizing to the first cell 2. The determination of the reference frequency error estimate can e.g. be performed by means of computations within the control unit 20, or can be looked up in a look-up table with pre-computed reference-frequency error estimate values. Such pre-computed values can e.g. be pre-computed by means of simulations.

Figure 3:
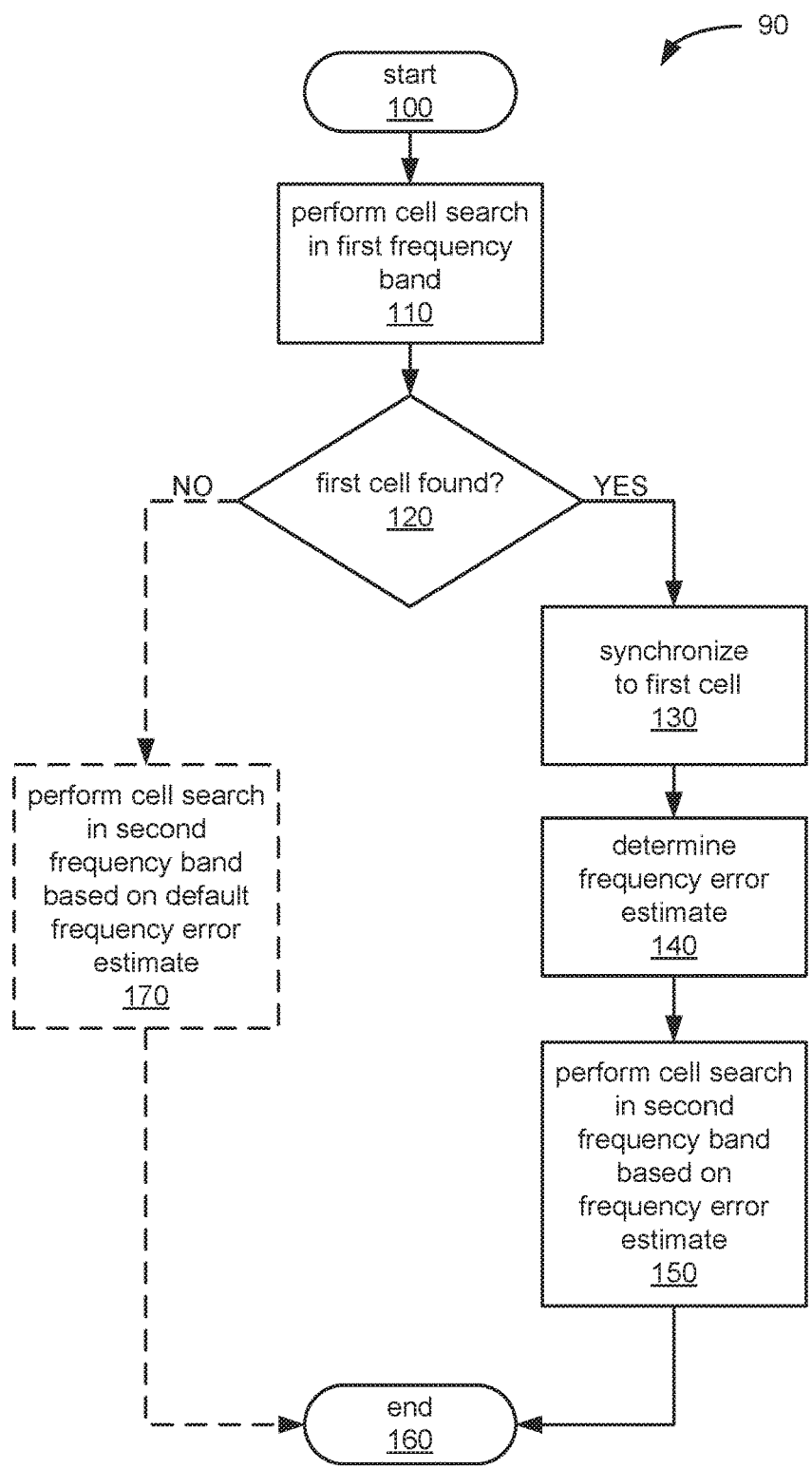
FIGS. 3-4 are flowcharts for methods according to embodiments.

FIG. 3 is a flow chart illustrating embodiments of the method, which is denoted with the reference sign 90. The operation of the method is started in step 100. In step 110, a cell search is performed in the first frequency band 4 in order to detect a first cell 2 of the first RAT. In step 120, it is checked whether such a first cell 2 is detected. If such a first cell 2 is detected (YES branch), the cellular communication device 1 synchronizes to the first cell 2, without registering to the first cell in step 130. In step 140, the reference frequency error estimate between the local reference frequency of the cellular communication device 1 and the reference frequency of the first cell 2 is determined, e.g. based on the reference signals and receiver processing parameters used for synchronization to the first cell 2 as outlined above. In step 150 a second cell search, based on the reference frequency error estimate, is performed in the second frequency band 7 to detect a second cell 5 of the second RAT, and proceeds to step 160 where the method 90 is ended.

If no first cell 2 is found in the first frequency band 4 in the first cell search, another type of cell search can be performed for searching for a cell of the second RAT in the second frequency band 7. For example, a default reference frequency error estimate may be assumed based on known tolerances of the reference frequency unit 30 when the reference frequency unit 30 has not been synchronized with a reference frequency of any cellular network. The method may then comprise performing a second cell search, based on the default reference frequency error estimate, in the second frequency band 7 to detect a second cell 5 of the second RAT. This alternative using a default reference frequency error estimate is illustrated in FIG. 3 with the optional step 170 used in some embodiments. If no first cell has been found in step 110, the operation of the method according to these embodiments follows the NO branch from step 120 to step 170. In step 170, the second cell search, for a cell of the second RAT; is performed in the second frequency band 7. The operation then proceeds to step 160, where the method 90 is ended. The frequency grid used in this case corresponds to the grid used when directly attempting a frequency gridding approach to search for the cell of the second RAT (without first synchronizing with another cell in a lower frequency band). Due to the relatively wide (and growing) coverage of existing 2G, 3G, and 4G networks, it is likely that failure to find any first cell 2 in the first cell search will be a relatively rare event. It should also be noted that, since the cellular communication device does not register with the first cell 3 in step 130, but only synchronizes with it, the set of possible such first cells 2 is not limited to cells with which the cellular communication device has a valid subscription to communicate over, but can include other cells as well (e.g. cells belonging to other operators).

As indicated above, the second cell search may be performed using a frequency gridding approach. Thus, for the case where a first cell 2 is found during the first cell search, performing the second cell search (e.g. step 150 in the flowchart of FIG. 3) may comprise searching a frequency grid of a set of hypothesized carrier frequencies. The second cell search can be based on the reference frequency error estimate in the sense that the frequency location of said frequency grid (i.e. which frequencies are included in said set of hypothesized carrier frequencies) is based on the reference frequency error estimate. As also indicated above, for the case when no such first cell 2 is found during the first cell search, the second cell search (e.g. performed in the step 170 of FIG. 3) can in a similar way be performed based on the default reference frequency error estimate. Thus, in that case, performing the second cell search (e.g. step 170 in the flowchart of FIG. 3) may comprise searching a frequency grid of a set of hypothesized carrier frequencies, wherein the second cell search can be based on the default reference frequency error estimate in the sense that the frequency location of said frequency grid (i.e. which frequencies are included in said set of hypothesized carrier frequencies) is based on the default reference frequency error estimate. Qualitatively speaking, the larger the reference frequency error estimate (either the determined reference frequency error estimate used in step 150 or the default frequency error estimate used in step 170) is, the larger the frequency grid needs to be.

The reference frequency error can, for example, be represented in absolute terms, such as ±X Hz at the nominal carrier frequency $f_{nom1}$ of the first cell of the first RAT. Let the corresponding reference frequency error at the nominal carrier frequency $f_{nom2}$ of the second cell be ±Y Hz. Since the relative error at both those nominal carrier frequencies should be the same, e.g. ±Z ppm, it follows that $$Y = X \frac{f_{nom2}}{f_{nom1}} \quad (1)$$

Thus, if the reference frequency error estimate is determined (e.g. in step 140 in FIG. 3) in absolute terms at the location of the first frequency band 4, it follows that the relative frequency location of the first frequency band 4 and the second frequency band 7 may need to be accounted for when determining the frequency location of the frequency grid used in the second cell search in step 150 (FIG. 3). For example, say that the first band is located around 2 GHz, and after synchronization with the first cell, the uncertainty of the reference frequency at 2 GHz is ±500 Hz, i.e. the reference frequency error estimate determined for a carrier frequency of 2 GHz is ±500 Hz. Then, as a first example, if the second frequency band 7 is located around 12 GHz, the corresponding uncertainty of the reference frequency in the second frequency band 7 would be ±500·12/2 Hz=±3 kHz. On the other hand, as a second example, if the second frequency band 7 is located around 30 GHz, the corresponding uncertainty of the reference frequency in the second frequency band 7 would be ±500·30/2 Hz=±7.5 kHz. The second example would likely require a wider frequency grid with more hypothesized carrier frequencies than the first example for the second cell search in step 150 (FIG. 3).

Accordingly, in some embodiments, the frequency location of said frequency grid used in the second cell search in step 150 (FIG. 3) is based also on the relative frequency location of the first frequency band 4 and the second frequency band 7.

According to some embodiments, the cell search method described above can be used as part of a procedure for connecting to a cell of the second RAT. Hence, according to some embodiments of the present invention, there is provided a method for the cellular communication device 1 of connecting to a cell of the second RAT. The method comprises performing the cell-search method 90 described above. Furthermore, if said second cell 5 is detected during the performance of the cell-search method 90 (and with reference to FIG. 3, this could be either in step 150 or in step 170), the method comprises registering with the second cell 5.

Figure 4:
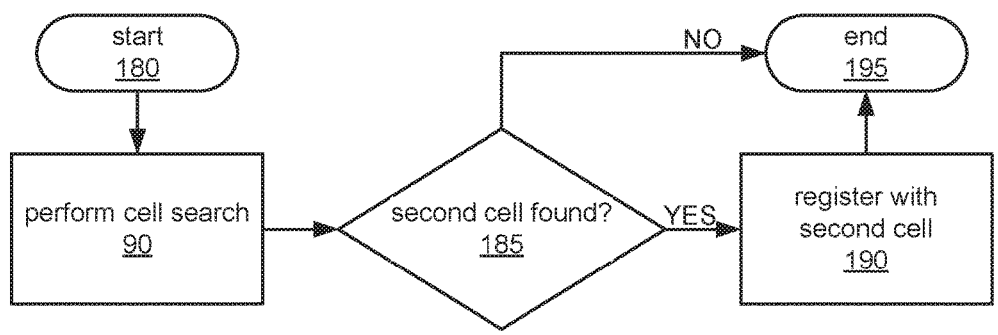

FIG. 4 is a flow chart illustrating embodiments of the method of connecting to a cell of the second RAT. The operation of the method is started in step 180, and then proceeds to performing a cell search according to the method 90 described above. In step 185, it is checked whether said second cell has been detected during said cell search, and again with reference to FIG. 3, this could be either in step 150 or step 170 (in embodiments that includes the step 170). If said second cell 5 has been detected (YES branch from step 185), the cellular communication device 1 registers with the second cell in step 190 (in accordance with registration procedures defined by a standard of the second RAT), and the method is ended in step 195. If no such second cell has been detected (NO branch from step 185), the method proceeds, without connecting to a cell of the second RAT (since no such cell has been detected), to step 195, where the method is ended. In the latter case, the cellular communication device may e.g. attempt to connect to a cell of another RAT, such as the first RAT, as a fallback. In some embodiments, for example if the cellular communication device 1 is capable of simultaneous connectivity with cells of multiple RATs, the cellular communication device may register with a cell of the first RAT even if a cell of the second RAT is found during the cell search 90. This may for example be done after or in parallel with the registration in step 190. As long as this is not performed prior to the searches performed in step 150 or step 170 (FIG. 3), such a registration would not negatively impact the overall search time for a cell of the second RAT.

Above, embodiments of methods for operating the cellular communication device are described. Some embodiments of the present invention, further described below, also concern the cellular communication device 1 configured to perform any of the methods described above. Thus, according to some embodiments of the present invention, there is provided a cellular communication device 1, as illustrated in FIG. 2, capable of communicating via a first RAT in a first frequency band (e.g. 4 in FIG. 1), and via a second RAT in a second frequency band (e.g. 7 in FIG. 1), which is in a higher frequency region than the first frequency band. According to these embodiments, the control unit 20 is adapted to perform a first cell search in the first frequency band 4 in order to detect a first cell 2 of the first RAT. The control unit 20 is further adapted to, if such a first cell 2 is detected, synchronize to the first cell 2, without registering to the first cell, to determine a reference frequency error estimate between a local reference frequency of the cellular communication device 1 and a reference frequency of the first cell 2, and thereafter perform a second cell search, based on the reference frequency error estimate, in the second frequency band 7 to detect a second cell 5 of the second RAT.

As has been described above in the context of embodiments of the method 90, the control unit 20 may be adapted to, in order to perform the second cell search, search a frequency grid of a set of hypothesized carrier frequencies, wherein the frequency location of said frequency grid is based on the estimated reference frequency error.

As has also been described above in the context of embodiments of the method 90, the frequency location of said frequency grid may be based also on the relative frequency location of the first frequency band 4 and the second frequency band 7.

Furthermore, as has also been described above in the context of some embodiments of the method 90, including the step 170, the control unit 20 may be adapted to, if such a first cell 2 in the first frequency band 4 is not detected, perform a second cell search, based on a default reference frequency error estimate, in the second frequency band 7 to detect a second cell 5 of the second RAT.

In accordance with what has been described above in the context of the method illustrated in FIG. 4, the control unit 20 may be adapted to, if said second cell 2 is detected, register the cellular communication device 1 with the second cell 2.

Figure 5:
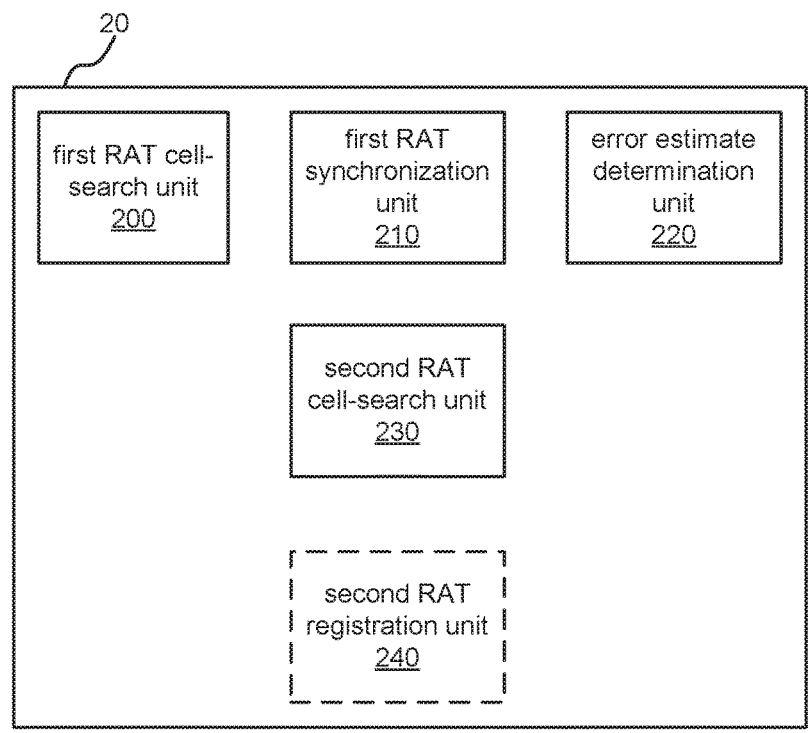
FIG. 5 illustrates a control unit according to an embodiment.

FIG. 5 is a simplified block diagram illustrating some embodiments of the control unit 20. As illustrated in FIG. 5, these embodiments of the control unit 20 comprises a first RAT cell-search unit 200 for performing cell searches in the first RAT, a first RAT synchronization unit 210 for synchronizing with cells of the first RAT, an error-estimate determination unit 220 for determining reference-frequency error estimates, and a second RAT cell-search unit 230 for performing cell searches in the first RAT.

The first RAT cell-search unit 200 is adapted to perform said first cell search in the first frequency band 4 in order to detect a first cell 2 of the first RAT.

The first RAT synchronization unit 210 is adapted to, if such a first cell 2 is detected, synchronize to the first cell 2, without registering to the first cell.

The error-estimate determination unit 220 is adapted to determine said reference frequency error estimate between said local reference frequency of the cellular communication device 1 and said reference frequency of the first cell 2

The second RAT cell-search unit 230 is adapted to perform said second cell search (corresponding to step 150 in FIG. 3), based on the reference frequency error estimate, in the second frequency band 7 to detect a second cell 5 of the second RAT.

The second RAT cell-search unit 230 may be adapted to, in order to perform the second cell search, search a frequency grid of a set of hypothesized carrier frequencies, wherein the frequency location of said frequency grid is based on the estimated reference frequency error. In some embodiments, the frequency location of said frequency grid may be based also on the relative frequency location of the first frequency band 4 and the second frequency band 7.

In some embodiments, the second RAT cell-search unit 230 may be adapted to, if such a first cell 2 in the first frequency band 4 is not detected, perform a second cell search (corresponding to step 170 in FIG. 3), based on the default reference frequency error estimate, in the second frequency band 7 to detect a second cell 5 of the second RAT.

As indicated in FIG. 5, the control unit 20 may in some embodiments also comprise a second RAT registration unit 240. The second RAT registration unit may be adapted to, if said second cell 2 is detected, register the cellular communication device 1 with the second cell 2.

Figure 6:
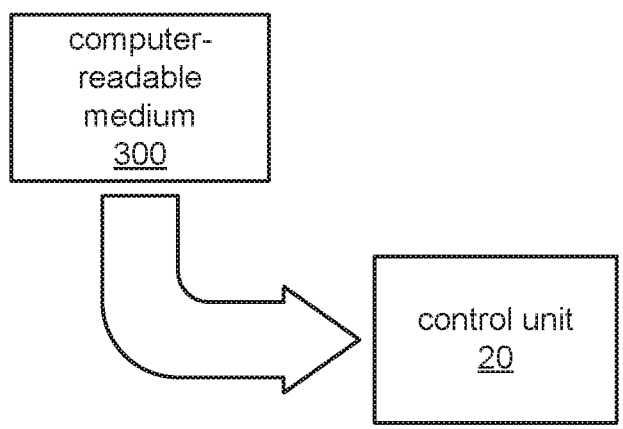
FIG. 6 schematically illustrates a computer-readable medium and a programmable control unit.

In some embodiments, the control unit 20 may be implemented as a dedicated application-specific hardware unit. Alternatively, said control unit 20, or parts thereof, may be implemented with programmable and/or configurable hardware units, such as but not limited to one or more field-programmable gate arrays FPGAs, processors, or microcontrollers. Thus, the control unit 20 may be a programmable control unit. Hence, embodiments of the present invention may be embedded in a computer program product, which enables implementation of the method and functions described herein, e.g. the embodiments of the methods described with reference to FIGS. 3 and 4. Therefore, according to embodiments of the present invention, there is provided a computer program product, comprising instructions arranged to cause the programmable control unit 20 to perform the steps of any of the embodiments of said methods. The computer program product may comprise program code which is stored on a computer readable medium 300, as illustrated in FIG. 6, which can be loaded and executed by said programmable control unit 20, to cause it to perform the steps of any of the embodiments of said methods. In some embodiments, the computer readable medium is a non-transitory computer-readable medium.

Embodiments describe herein enables relatively quick cell searches in RATs operating at relatively high carrier frequencies, e.g. in the order of 10-30 GHz. An alternative solution to enable relatively quick cell searches could be to use a reference frequency unit, such as a crystal oscillator, with a higher intrinsic accuracy in the cellular communication device. However, that solution would likely be more costly, so in comparison with that alternative solution, embodiments of the present invention can provide a lower cost. Another alternative solution to enable relatively quick cell searches could be to perform a parallel cell search, where the cell search is performed for several hypothesized carrier frequencies simultaneously. However, that solution would likely require more complex signal processing increasing the cost either in terms of the power consumption or the required chip area (or both), so in comparison also with that solution, embodiments of the present invention can provide a lower cost.

The present invention has been described above with reference to specific embodiments. However, other embodiments than the above described are possible within the scope of the invention. Different method steps than those described above, performing the method by hardware or software, may be provided within the scope of the invention. The different features and steps of the embodiments may be combined in other combinations than those described. The scope of the invention is only limited by the appended patent claims.

The invention claimed is:

1. A method for a cellular communication device capable of communicating via a first radio-access technology (RAT) in a first frequency band located below 4 GHz, and via a second RAT in a second frequency band located above 10 GHz, comprising:
    performing a first cell search in the first frequency band in order to detect a first cell of the first RAT; and
    if such a first cell is detected:
        synchronizing to the first cell, without registering to the first cell; and thereafter
        performing a second cell search in the second frequency band to detect a second cell of the second RAT; and
    if said second cell is detected:
        registering with the second cell.

2. The method according to claim 1, wherein performing the second cell search comprises:
    searching a frequency grid of a set of hypothesized carrier frequencies, wherein the frequency location of said frequency grid is based on a reference frequency error estimate determined in connection with the synchronization with the first cell.

3. The method according to claim 2, wherein the frequency location of said frequency grid is based also on the relative frequency location of the first frequency band and the second frequency band.

4. The method according to claim 1, wherein the first RAT is any of a 2nd generation (2G) cellular communication RAT, a 3rd generation (3G) cellular communication RAT, and a 4th generation (4G) cellular communication RAT.

5. The method according to claim 1, wherein the second RAT is a 5th generation, 5G, cellular communication RAT.

6. A cellular communication device capable of communicating via a first radio-access technology (RAT) in a first frequency band located below 4 GHz, and via a second RAT in a second frequency band located above 10 GHz, comprising:
    a transceiver unit;
    a control unit adapted to:
        receive signals from base stations using the transceiver unit;
        perform a first cell search in the first frequency band in order to detect a first cell of the first RAT; and
        if such a first cell is detected:
            synchronize to the first cell, without registering to the first cell; and thereafter perform a second cell search, based on the reference frequency error estimate, in the second frequency band to detect a second cell of the second RAT; and if said second cell is detected, register the cellular communication device with the second cell.

7. The cellular communication device according to claim 6, wherein the control unit is adapted to, in order to perform the second cell search, search a frequency grid of a set of hypothesized carrier frequencies, wherein the frequency location of said frequency grid is based on a reference frequency error estimate determined in connection with the synchronization with the first cell.

8. The cellular communication device according to claim 7, wherein the frequency location of said frequency grid is based also on the relative frequency location of the first frequency band and the second frequency band.

9. The cellular communication device according to claim 6, wherein the first RAT is any of a 2nd generation (2G) cellular communication RAT, a 3rd generation (3G) cellular communication RAT, and a 4th generation (4G) cellular communication RAT.

10. The cellular communication device according to claim 6, wherein the second RAT is a 5th generation (5G) cellular communication RAT.

* * * * *

UNITED STATES PATENT AND TRADEMARK OFFICE
CERTIFICATE OF CORRECTION

PATENT NO. : 10,021,632 B2  
APPLICATION NO. : 15/822177  
DATED : July 10, 2018  
INVENTOR(S) : Lindoff et al.

It is certified that error appears in the above-identified patent and that said Letters Patent is hereby corrected as shown below:

In the Specification

In Column 1, Line 9, delete "date)," and insert -- date), now Pat. No. 9,854,511, --, therefor.

In Column 1, Line 29, delete "Program)" and insert -- Project) --, therefor.

In Column 1, Line 30, delete "MHz." and insert -- MHz, --, therefor.

In Column 2, Line 61, delete "a the" and insert -- the --, therefor.

In Column 5, Line 17, delete "GHz." and insert -- GHz, --, therefor.

In Column 8, Line 34, delete "first cell 3" and insert -- first cell 2 --, therefor.

In Column 10, Line 58, delete "second cell 2" and insert -- second cell 5 --, therefor.

In Column 10, Lines 59-60, delete "second cell 2." and insert -- second cell 5. --, therefor.

In Column 11, Line 36, delete "second cell 2" and insert -- second cell 5 --, therefor.

In Column 11, Line 37, delete "second cell 2." and insert -- second cell 5. --, therefor.

Signed and Sealed this  
Twenty-seventh Day of November, 2018

Andrei Iancu  
*Director of the United States Patent and Trademark Office*